(12) United States Patent
Skvorecz

(10) Patent No.: US 11,596,267 B2
(45) Date of Patent: Mar. 7, 2023

(54) ROTATABLE CLAMPING HANDLE FOR A RIB AND ROAST RACK OR WIRE CHAFING STAND

(71) Applicant: Robert J. Skvorecz, Kinnelon, NJ (US)

(72) Inventor: Robert J. Skvorecz, Kinnelon, NJ (US)

( * ) Notice: Subject to any disclaimer, the term of this patent is extended or adjusted under 35 U.S.C. 154(b) by 330 days.

(21) Appl. No.: 16/985,272

(22) Filed: Aug. 5, 2020

(65) Prior Publication Data

US 2022/0039604 A1 Feb. 10, 2022

(51) Int. Cl.
| | |
|---|---|
| *A47J 45/07* | (2006.01) |
| *A47J 36/34* | (2006.01) |
| *A47J 36/00* | (2006.01) |
| *A47J 37/06* | (2006.01) |

(52) U.S. Cl.
CPC .............. *A47J 45/07* (2013.01); *A47J 36/34* (2013.01); *A47J 37/0694* (2013.01)

(58) Field of Classification Search
CPC .... A47J 36/34; A47J 36/2405; A47J 37/0694; A47J 45/07; A47J 45/075; A47J 45/062; A47J 45/065; A47J 36/30; A47J 36/06; A47J 36/02; A47J 36/022; A47J 36/2477; A47J 36/14; A47J 43/18; B65D 7/20; B65D 43/0202
USPC ....... 220/573.1, 743, 485, 647; 99/426, 449, 99/413, 427, 448, 450; 211/181.1, 195, 211/43, 85, 85.31; 248/153, 165, 175, 248/150, 176.1, 188.6, 439; 292/113; 24/270
See application file for complete search history.

(56) References Cited

U.S. PATENT DOCUMENTS

| | | | | |
|---|---|---|---|---|
| 629,127 | A * | 7/1899 | Geer .................... | A47J 37/0694 99/402 |
| 823,071 | A * | 6/1906 | Nelson ................. | B65D 51/242 294/34 |
| 1,241,002 | A * | 9/1917 | Neuens .................... | A47J 27/04 99/413 |
| 1,283,389 | A * | 10/1918 | Wills ........................ | B65D 7/26 211/74 |
| 1,532,016 | A * | 3/1925 | Wright .................. | A47J 41/022 220/592.2 |
| 2,101,487 | A * | 12/1937 | Anderson .............. | A47J 37/108 211/74 |
| 3,063,360 | A * | 11/1962 | Fitch ....................... | A47J 43/18 269/54.5 |
| 3,075,798 | A * | 1/1963 | Smith ..................... | A47J 43/18 294/169 |
| 3,273,747 | A * | 9/1966 | Kalz ........................ | A47J 36/10 220/772 |
| 3,972,318 | A * | 8/1976 | Lenoir .................... | A47J 37/10 D7/354 |

(Continued)

*Primary Examiner* — Gideon R Weinerth

(74) *Attorney, Agent, or Firm* — Michael J. Feigin, Esq.; Feigin and Fridman LLC

(57) ABSTRACT

A removable, retrofit, and/or rotatably attached handle is attached to a top wire of a wire chafing stand in embodiments of the disclosed technology. The handle can be rotated upwards such that a curved bend within the handle locks in place a first pan resting on the top wire of the wire chafing stand. A second pan, oriented upside down compared to the first pan, can be placed thereover, as a lid, on the first pan and held in place by the curved bend within the handle. The top and bottom pan are held in place by the same curved bend or bends of one or more such handles.

20 Claims, 9 Drawing Sheets

(56) References Cited

U.S. PATENT DOCUMENTS

| | | | | |
|---|---|---|---|---|
| 4,648,379 A * | 3/1987 | Fordyce | | A47J 37/0694 |
| | | | | 99/426 |
| 4,718,402 A * | 1/1988 | Fordyce | | A47J 37/0694 |
| | | | | 99/426 |
| 4,852,760 A * | 8/1989 | Sarnoff | | A47J 36/022 |
| | | | | 220/573.1 |
| 5,163,577 A * | 11/1992 | Lee | | B65F 1/1615 |
| | | | | 220/765 |
| D333,235 S * | 2/1993 | Bertelsen | | D7/388 |
| 5,339,728 A * | 8/1994 | Marchwiak | | A47J 36/22 |
| | | | | 220/756 |
| D364,994 S * | 12/1995 | Tiemann | | A47J 43/287 |
| | | | | D7/409 |
| 5,826,494 A * | 10/1998 | Wang | | A47J 27/04 |
| | | | | 99/413 |
| 6,065,629 A * | 5/2000 | Sarnoff | | B65D 1/34 |
| | | | | 220/573.1 |
| 6,341,704 B1 * | 1/2002 | Michel, Jr. | | A47L 19/04 |
| | | | | 211/119.011 |
| 6,457,594 B1 * | 10/2002 | Tiemann | | A47J 36/22 |
| | | | | 211/181.1 |
| 6,520,354 B1 * | 2/2003 | Skvorecz | | A47J 36/2477 |
| | | | | 248/153 |
| 6,595,120 B1 * | 7/2003 | Tiemann | | A47J 43/18 |
| | | | | 99/449 |
| 6,705,210 B2 * | 3/2004 | Leonard | | A47J 43/287 |
| | | | | 220/573.1 |
| 6,955,327 B1 * | 10/2005 | Skvorecz | | A47J 36/34 |
| | | | | 248/153 |
| D577,256 S * | 9/2008 | Schutte | | D7/409 |
| D621,218 S * | 8/2010 | Schutte | | B65D 1/34 |
| | | | | D7/409 |
| 8,360,445 B2 * | 1/2013 | Meers | | E05C 19/06 |
| | | | | 220/318 |
| D688,921 S * | 9/2013 | Miros | | A47J 36/22 |
| | | | | D7/629 |
| 8,678,223 B2 * | 3/2014 | Sarnoff | | A47J 45/062 |
| | | | | 220/23.91 |
| 9,339,145 B1 * | 5/2016 | Owczarzak | | A47J 37/0713 |
| 9,517,858 B2 * | 12/2016 | Skvorecz | | A47B 87/0207 |
| D788,518 S * | 6/2017 | Aggarwal | | A47J 36/10 |
| | | | | D7/360 |
| 9,861,228 B1 * | 1/2018 | Fariello | | A47J 36/2405 |
| 10,016,084 B1 * | 7/2018 | Saiz, Jr. | | A47J 27/002 |
| D932,833 S * | 10/2021 | Gill | | A47J 41/022 |
| | | | | D7/409 |
| 2004/0187705 A1 * | 9/2004 | Mann | | A47J 36/16 |
| | | | | 99/426 |
| 2005/0217494 A1 * | 10/2005 | Hrushowy | | A47J 36/22 |
| | | | | 99/413 |
| 2010/0136194 A1 * | 6/2010 | Schutte | | A47J 36/22 |
| | | | | 99/413 |
| 2010/0236424 A1 * | 9/2010 | Krent | | A47J 36/22 |
| | | | | 220/573.1 |
| 2013/0081361 A1 * | 4/2013 | Miros | | B65B 7/26 |
| | | | | 206/541 |
| 2013/0313211 A1 * | 11/2013 | Skvorecz | | B65D 21/046 |
| | | | | 29/428 |
| 2016/0128509 A1 * | 5/2016 | Skvorecz | | A47J 47/14 |
| | | | | 248/153 |
| 2018/0168394 A1 * | 6/2018 | Casternovia | | A47J 36/30 |
| 2020/0077842 A1 * | 3/2020 | Rose | | A47J 37/0694 |
| 2022/0039604 A1 * | 2/2022 | Skvorecz | | A47J 45/07 |
| 2022/0039606 A1 * | 2/2022 | Skvorecz | | A47J 47/14 |

* cited by examiner

ROTATABLE CLAMPING HANDLE FOR A RIB AND ROAST RACK OR WIRE CHAFING STAND

FIELD OF THE DISCLOSED TECHNOLOGY

The disclosed technology relates generally to wire implements, and more specifically to handles for carrying wire chafing stands and rib/roast racks and for locking a lid in place on these implements.

BACKGROUND

Wire chafers and wire chafing stands are used to hold pans, often with a heating device held below the pan. Catering establishments and restaurants often use such devices when keeping food warm at a location other than where the food was initially prepared. For example, chafers are used in places such as banquet halls and the like, where large amounts of food are constantly being served. Further, Caterers will Drop-Off prepared food to a Customers location and leave the wire chafer along with the food and go. Restaurants use wire chafers for carry out orders, where customers pick up prepared food and take it home along with several wire chafing stands. Customers will then set up a buffet line in their home or backyard or even tailgate at a football stadium. This type of carry out is very popular with Mexican style restaurants.

Once the chafing stands are set up, however, they can be difficult to move and also protect the food from the elements. Their shape, with the addition of a pan of food, may be unwieldy and cause the food to be spilled. In addition, when outside with no practical way to hold a lid on top of the wire chafing stand, there is the problem of quick cooling from windy conditions and also bugs of all types landing on the food. These problems also hinder chafing stands from being used widely in other cooking situations.

Thus, there is a need for a wire chafing stand which can be easily and safely carried even and keep a lid in place prior to use during the setup and pre-heating stages just before guest begin serving themselves, buffet style. This and other problems are solved by embodiments of the disclosed technology, as described below.

A rib and roast rack with uses a lower pan that the rack is placed in creates allows moisture to be introduced to the cooking process. However, without a lid most of the moisture escapes. By placing and locking a lid over the and onto the lower pan a vessel is created locking in the moisture during the cooking process. This prevents moisture escape and creates juicer foods, as a result. Further the lid prevents loss of heat and with the retained moisture cooking times are decreased while providing better tasting ribs and roasts Holding a lid in place on a rib rack produces better tasting ribs in less time and keeping a lid on a wire chafer keeps heat in along with moisture and keeps bugs and fly out of the food.

SUMMARY OF THE DISCLOSED TECHNOLOGY

A retrofitted or integrated handle for a rib and roast rack and/or wire chafing stand of embodiments of the disclosed technology has a single wire with a line of symmetry between two extreme ends, the line of symmetry being perpendicular to and bisecting a center of a first linear portion of the single wire. Either side of the first linear portion of this single wire terminates in a right angle bend forming a transverse portion of the single wire on either side of the first linear portion. On an opposite end of each transverse portion from the right angle bend, each transverse portion terminates in two oppositely-oriented coplanar bends. An exterior bend of these two oppositely-oriented coplanar bends is further from the first linear portion and is smaller than an interior bend of the two oppositely-oriented coplanar bends. In some embodiments, the exterior bend terminates in a second linear portion. This second linear portion is disposed, in embodiments, at an acute angle compared to the transverse portion.

"Line of symmetry" is defined as "an axis which passes through a substantial midpoint of the single wire and divides the wire into substantially or exactly (as is considered so in the art) identical halves." Linear is defined as "arranged along and/or extending in a direction of a substantially or exactly (as is considered so in the art) straight line, e.g. without bending in any Euclidean plane." Right angle is defined as "an angle substantially equal to, or equal to (as is considered so in the art), 90 degrees." Transverse is defined as "arranged along and/or extending in a direction of a substantially perpendicularly-situated line relative to another linear portion of a wire or object."

"A portion terminating" is defined as "a portion of the single wire meeting a different portion of the single wire forming a unitary or continuous structure thereof." For example, a portion terminating can be a point where the first linear portion meets the two right angles bends, a point where the transverse section meets the interior bend, and/or a the point where the exterior bend meets the second linear portion." "Termination" is defined as "a tip where the second linear portion ends and/or the tip where a longest planar length of the single wire ends." Bend is defined as "a substantially fixed curvilinear region." Acute angle is defined as "an angle equal to less than 90 degrees."

In embodiments, the first linear portion of the single wire has a length greater than a length of the transverse portion of the single wire. In other embodiments, a length of said two oppositely-oriented coplanar bends is smaller than the length of each transverse portion. A length of the second linear portion is, in various embodiments, smaller than the length of the two oppositely-oriented coplanar bends.

The exterior bend of the two semi-circular bends has an opening facing, in embodiments, an opposite direction relative to the interior bend.

"Semi-circular bends" is defined as "segments with semi-circular portions which can have a flat part".

The exterior bend, in some embodiments, is rotatable about a top wire of the wire chafing stand. The interior bend, in embodiments, clamps rims of two pans together which are situated above the wire and which have resting between thereof a rib rack while the handle is rotated upwards with respect to a resting position thereof.

In various embodiments, the single wire is rotatably attached to a top wire of a wire chafing stand by way of the exterior bends. The exterior bends are adapted to secure a bottom pan to the wire chafing stand. These exterior bends, in embodiments, hold the bottom pan in place when the single wire is rotated to extend transverse relative to a top plane of the top wire.

Rotatably attached is defined as "permanently or removably connected in a manner which allows one object to rotate with respect to another object." Cardinal directions used in this disclosure are with reference to a common way the devices disclosed are used. This is for convenience of the description thereof and is not limiting the scope of the technology. Thus, "top" generally refers to a vector direction towards what is referred to as the top rectangular wire of the chafing stand and what is referred to as a "top pan" where as "bottom" generally refers to where the wiring chafing stand rests on a surface there-beneath. "A top plane of the top wire" is defined as "a plane in which substantially all parts of the top wire lie."

The exterior bends, in other embodiments, hold a top pan in an oppositely-disposed orientation compared to said bottom pan, such that the exterior bends simultaneously hold the top pan and the bottom pan. In further embodiments, the exterior bends hold the top pan in an oppositely-oriented orientation compared to the bottom pan and a rib rack rests between the top pan and the bottom pan, such that the exterior bends simultaneously hold the top pan, the rib rack, and the bottom pan.

Additionally and/or instead of the wire chafing stand described above, a wire chafing stand in embodiments of the disclosed technology has a top wire, such a rectangular top wire, and a handle. This handle has two extreme ends, each end with two semi-circular bends. An exterior bend of the two semi-circular bends is rotatably connected to the top wire, and an interior bend of the two semi-circular bends has an opening facing an opposite direction compared to the exterior bend.

A kit of embodiments of the disclosed technology has the wire chafing stand and handle described above and a first pan. The first pan has a top edge parallel to the top plane of the top wire, and is held substantially in place relative to the wire chafing stand by way of a semi-circular or other bend of the handle. In other embodiments, the kit further includes a second pan. The opening of the second pan is oppositely-oriented compared to the first pan and is parallel to the top plane of the top wire. As such, the top and bottom pans can have openings facing towards each other which substantially form a closed space there-between. The second pan is held substantially in place relative to the wire chafing stand by way of bends in the handle, such as the interior bends. In further embodiments, the interior bends simultaneously hold the first pan and second pan to each other at the edges thereof.

In some embodiments, an exterior bend of the two substantially oppositely-oriented coplanar curves is rotatably attached to the top wire.

Additionally and/or instead of the wire chafing stand described above, a rotatable locking handle for wire elements of embodiments of the disclosed technology has a lower rectangular wire and a handle. The handle has two extreme ends, each with two semi-circular bends. An exterior bend of the two semi-circular bends is rotatably connected to the lower rectangular wire. An interior bend of the two semi-circular bends has an opening facing an opposite direction compared to said exterior bend.

A kit of embodiments of the disclosed technology has the rotatable locking handle described above and a first pan. The first pan has a top edge parallel to a plane of the lower rectangular wire and is held substantially in place relative to the lower rectangular wire by way of the interior bend.

The kit, in embodiments, further has a second pan with sides and an opening there-between, the opening being oppositely disposed from the first pan and being parallel to the plane of said lower rectangular wire. The second pan is held substantially in place resting on the first pan by way of the interior bend. In other embodiments, the kit further has an upper rectangular wire. The upper rectangular wire rests in between the first pan and the second pan and rests parallel to the plane of the lower rectangular wire. The interior bends simultaneously hold the first pan and the second pan, with the upper rectangular wire held in between thereof.

In other embodiments, an exterior bend of the two substantially oppositely-oriented coplanar curves is rotatably attached to the lower rectangular wire.

The rib and roast rack and/or wire chafing stand is adapted, in embodiments, to be carried by way of the handle when the handle is rotated to extend transverse relative to the plane of the lower rectangular wire.

The rib and roast rack and/or wire chafing stand is adapted, in embodiments, to be carried by way of the handle when the handle is rotated to extend transverse relative to the top plane of the top wire. The exterior bend is sized to rotate around a wire, and the interior bend is sized to clamp or hold the rims two pans together.

A "rib rack" or "rib and roast wrack" is defined as "a three-dimensional rectangular, ovoid, circular, or other polygonalshape having a wire which has a shape substantially equal to a top edge of a rim of the bottom and/or top pans".

The wires used, such as the lower rectangular wire and upper rectangular wire, can be modified in embodiments of the disclosed technology to be oval, square, or any other regular or irregal polygonal shape. When the wire attaches in a continuous path, whether formed from a single piece of wire or multiple pieces of wire joined together, the wire is said to be "closed". That is, "closed" is defined as "forming a loop."

Any device or step to a method described in this disclosure can comprise or consist of that which it is a part of, or the parts which make up the device or step. The term "and/or" is inclusive of the items which it joins linguistically and each item by itself.

DETAILED DESCRIPTION OF EMBODIMENTS OF THE DISCLOSED TECHNOLOGY

A removable, retrofit, and/or rotatably attached handle is attached to a top wire of a wire chafing stand in embodiments of the disclosed technology. The handle can be rotated upwards such that a curved bend within the handle locks in place a first pan resting on the top wire of the wire chafing stand. A second pan, oriented upside down compared to the first pan, can be placed thereover the first plan and held in place by the curved bend within the handle. The top and bottom pan are held in place by the same curved bend or bends of one or more such handles.

Embodiments of the disclosed technology will become more clear in view of the following discussion of the figures.

Figure 1:
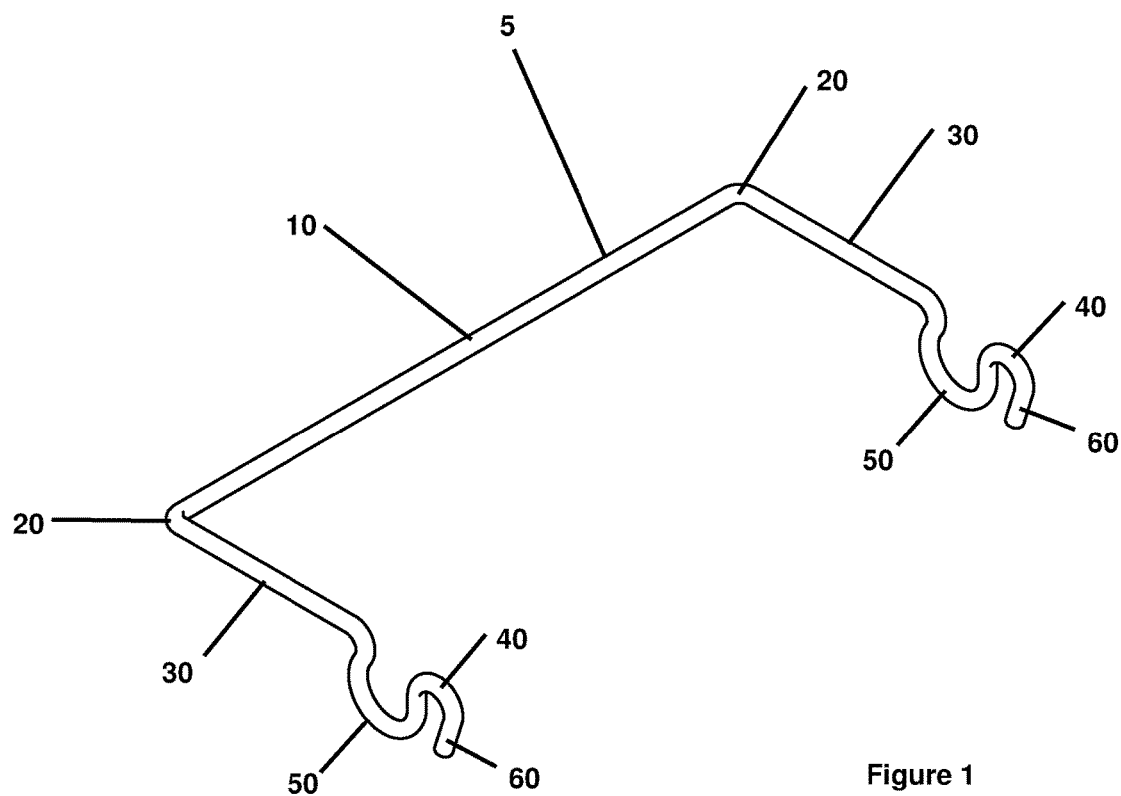
FIG. 1 is a perspective view of a handle for a wire chafing stand of embodiments of the disclosed technology.

FIG. 1 is a perspective view of a handle 5 for a wire chafing stand and/or rib and roast rack of embodiments of the disclosed technology. The wire comprises a first linear portion 10 with a line of symmetry between two extreme ends, the line of symmetry being perpendicular to and bisecting a center of the first linear portion 10 of the single wire. Either side of the first linear portion terminates in a right angle bend 20. These right angle bends 20 form a transverse portion 30 of the single wire on either side of the first linear portion 10. Each of the transverse portions 30 terminate in two oppositely-oriented coplanar bends 40, 50. An exterior bend 40 of these two oppositely-oriented coplanar bends 40, 50 is disposed further from the first linear portion 10 and is smaller than an interior bend 50 of the two oppositely-oriented coplanar bends 40, 50. The exterior bend 40 is sized to be rotatably connected to a top wire 90 of a wire chafing stand 80, and the interior band 50 is sized to clamp two pans 100, 200 together when the two pans 100, 200 are placed within the wire chafing stand 80, in embodiments of the disclosed technology. Clamp is defined as "hold in substantially a single position by way of pressing on a single point from either side of a plane which holds the single point."

Figure 2:
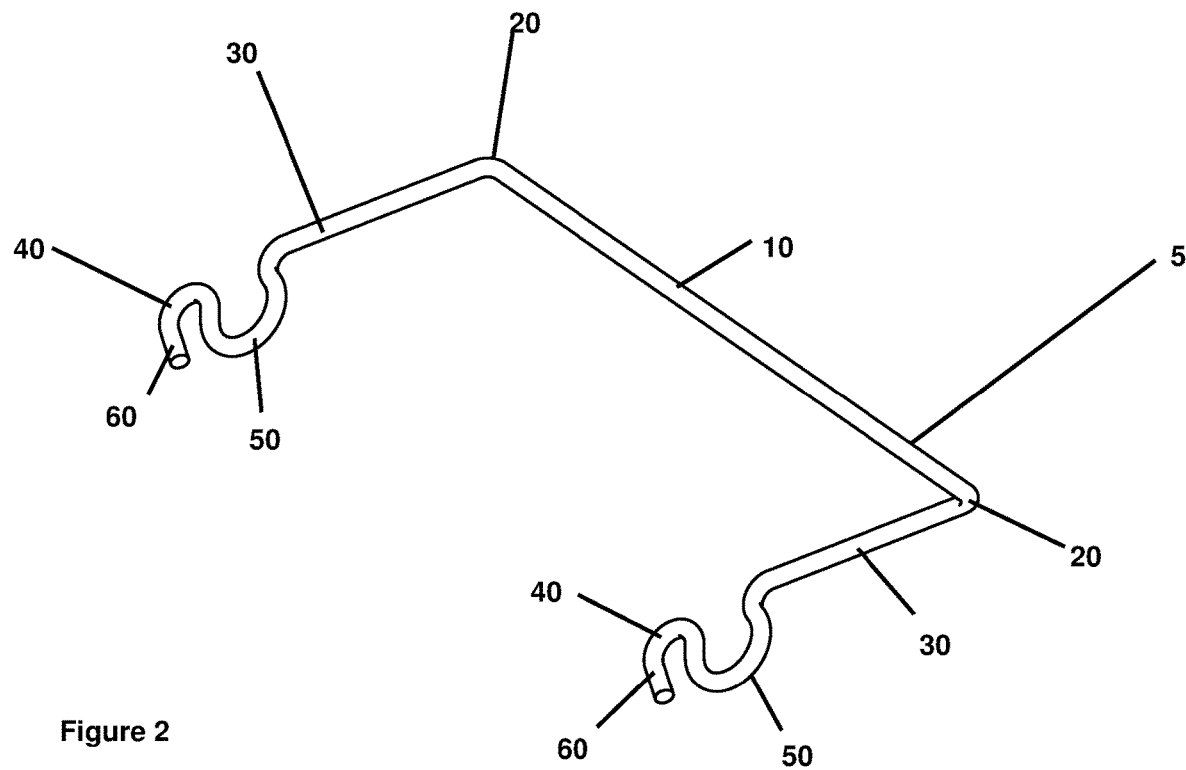
FIG. 2 is a reverse perspective view of the handle for a wire chafing stand of FIG. 1.

FIG. 2 is a reverse perspective view of the handle for a wire chafing stand of FIG. 1. The handle 5 is formed from a single wire in embodiments of the disclosed technology and is bent such that there is a central line of symmetry between extreme ends of the handle 5. The handle 5 has a first linear portion 10 which terminates at either end at a right angle bend 20, whereby the wire continues in a transverse segment (or portion) 30. Each of these transverse portions 30 terminates, at an other end thereof, in two oppositely-oriented coplanar bends 40, 50. An exterior bend 40 of these two oppositely-oriented coplanar bends 40, 50 is disposed further from the first linear portion 10 and is smaller, in some embodiments of the disclosed technology, than an interior bend 50 of the two oppositely-oriented coplanar bends 40, 50. The exterior bend 40 terminates in a second linear portion 60.

Figure 3:
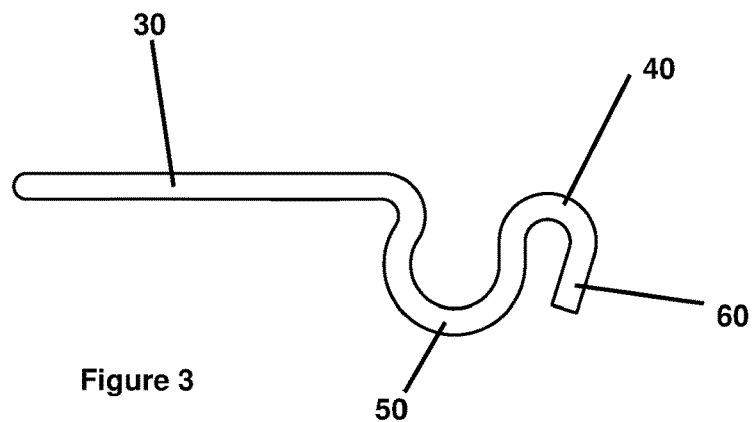
FIG. 3 is a side elevation view of the handle for a wire chafing stand of FIG. 1, the reverse side being a mirror image thereof.

FIG. 3 is a side elevation view of the handle for a wire chafing stand of FIG. 1, the reverse side being a mirror image thereof. The transverse portion 30 terminates in interior bend 50, which is substantially larger than exterior bend 40. Exterior bend 40 terminates in the second linear portion 60. Exterior bend 40 and interior bend 50 are disposed inline and are both substantially semi-circular in shape. A circumferential opening in exterior bend 40 faces in an opposite direction relative to that of a circumferential opening in interior bend 50. The entirety of interior bend 50, exterior bend 40, and second linear portion 60 is inline with and/or on the same side of a line inline with transverse portion 30, in embodiments of the disclosed technology.

This second linear portion 60 is disposed, in embodiments, at an acute angle compared to the transverse portion 30. In embodiments, a length of the first linear portion 10 is greater than a length of the transverse portion 30.

Figure 4:
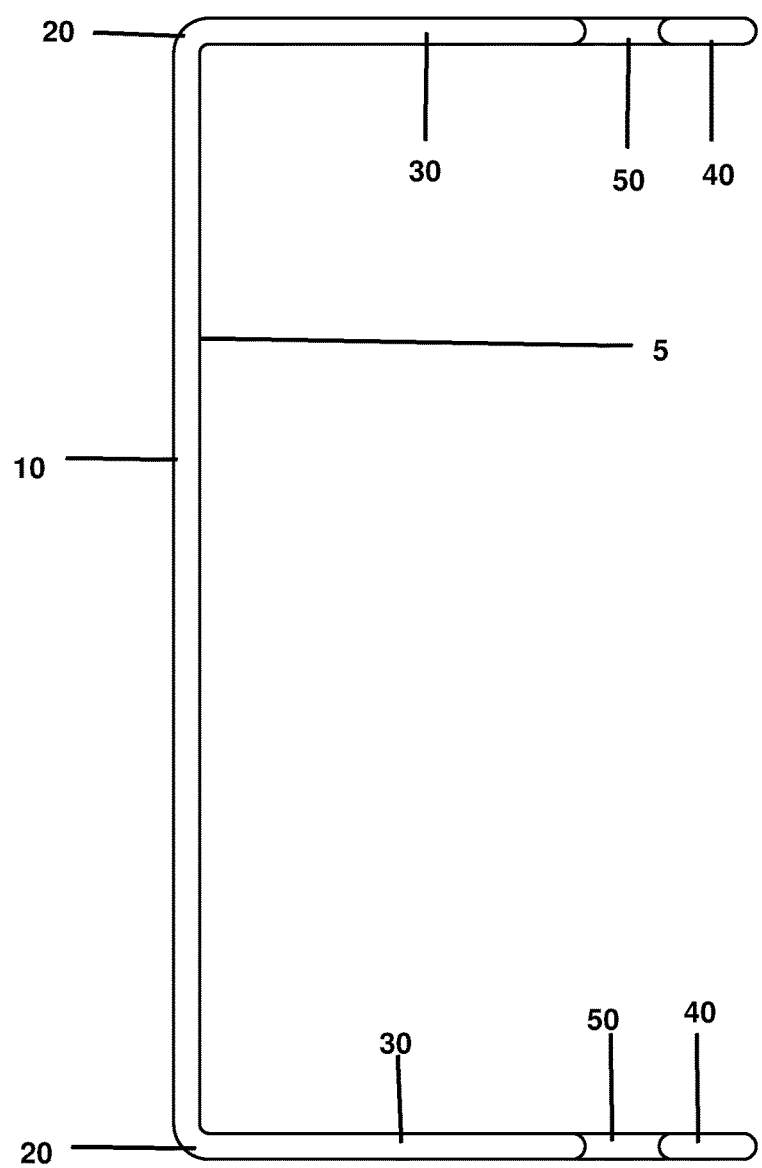
FIG. 4 is a top plan view of the handle for a wire chafing stand of FIG. 1.

FIG. 4 is a top plan view of the handle for a wire chafing stand of FIG. 1. Each of right angle bend 20, transverse portion 30, interior bend 50, and exterior bend 40 are substantially identical to their respective counterparts across a line of symmetry bisecting the first linear portion 10. As seen in this top plan view of this particular embodiment of the handle 5, in this orientation the handle 5 forms a vertical line with two horizontal lines at each end of the vertical line.

Figure 5:
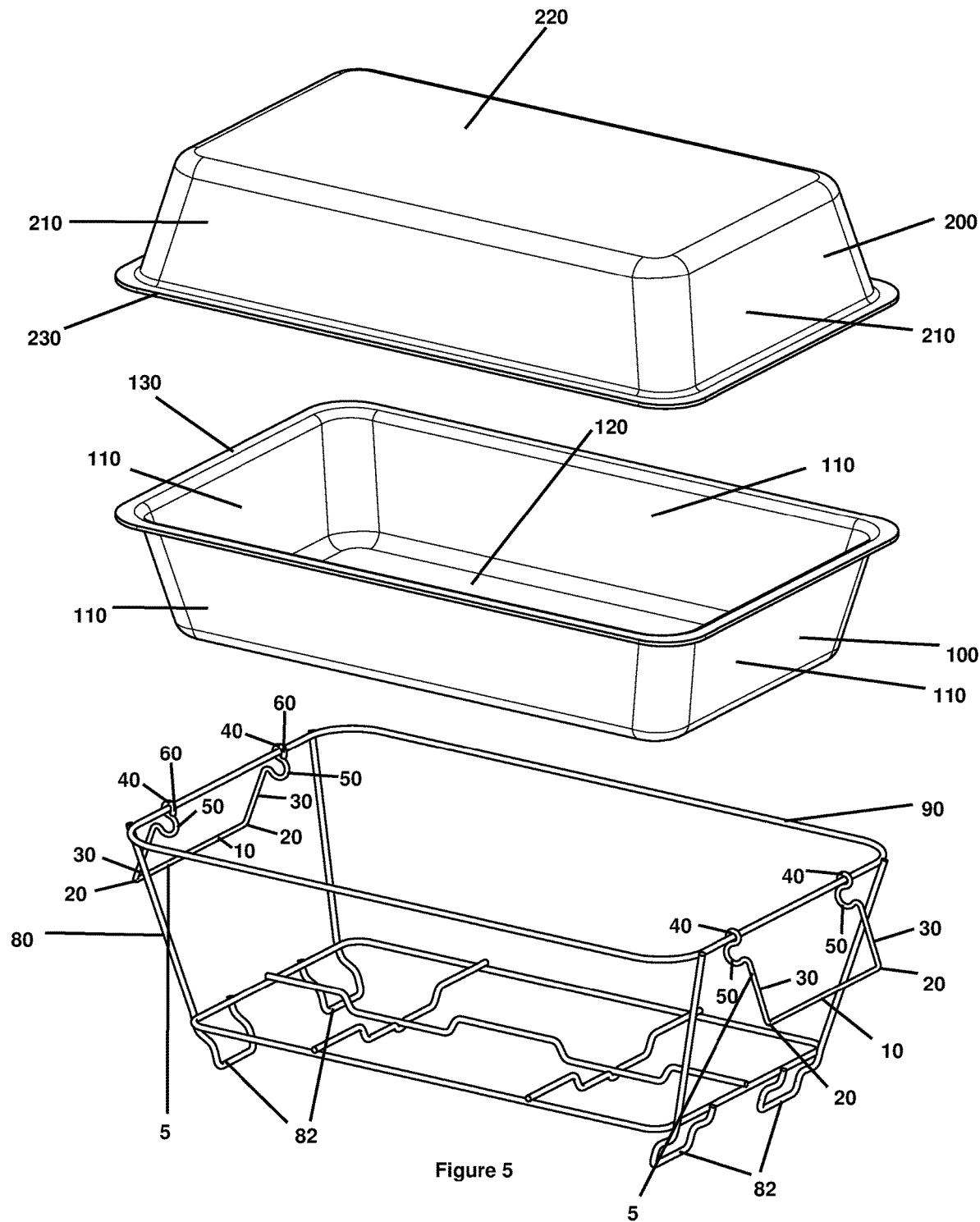
FIG. 5 is an exploded perspective view of a wire chafing stand with handles and pans of embodiments of the disclosed technology.

FIG. 5 is an exploded perspective view of a wire chafing stand with handles and pans of embodiments of the disclosed technology. The pans 100, 200 are substantially identical in some embodiments, and each has a largest planar portion 120, 220, respectively, surrounded by four edges 110, 210, respectively, with an opening therebetween. A plane enclosed by the parts of the edges 210 of the top pan 200 furthermost from the largest planar portion 230 of the top pan 200 is substantially parallel to a plane enclosed by the parts of the edges 110 of the bottom pan 100 furthermost from the largest planar portion 120 of the bottom pan 100, and the top pan 200 is oppositely-disposed relative to the bottom pan 100.

One or more handles 5 attached to the wire chafing stand 80 can be those shown in FIG. 1, and the handles 5 are substantially identical or identical to one another such as those of FIG. 1. In embodiments, they are rotatably connected to a top wire 90 by way of exterior bends 40. The connection is secured, in embodiments, by second linear portions 60. The handles 5 are connected to the wire chafing stand 80 such that when the handles 5 are hanging between a top plane of top wire 90 and a plane of parts of legs 82 (at a "bottom" of the wire chafing stand 80) designated, in embodiments of the disclosed technology, to stand flat on a supporting surface, a distance between a part of interior bend 50 of one handle 5 which is closest to a central point of wire chafing stand 80 and a part of interior bend 50 of an oppositely-disposed handle 5 which is closest to a central point of wire chafing stand 80 is less than a distance between first linear portion 10 of one handle 5 and first linear portion 10 of an oppositely-disposed handle 5, in embodiments of the disclosed technology.

Figure 6:
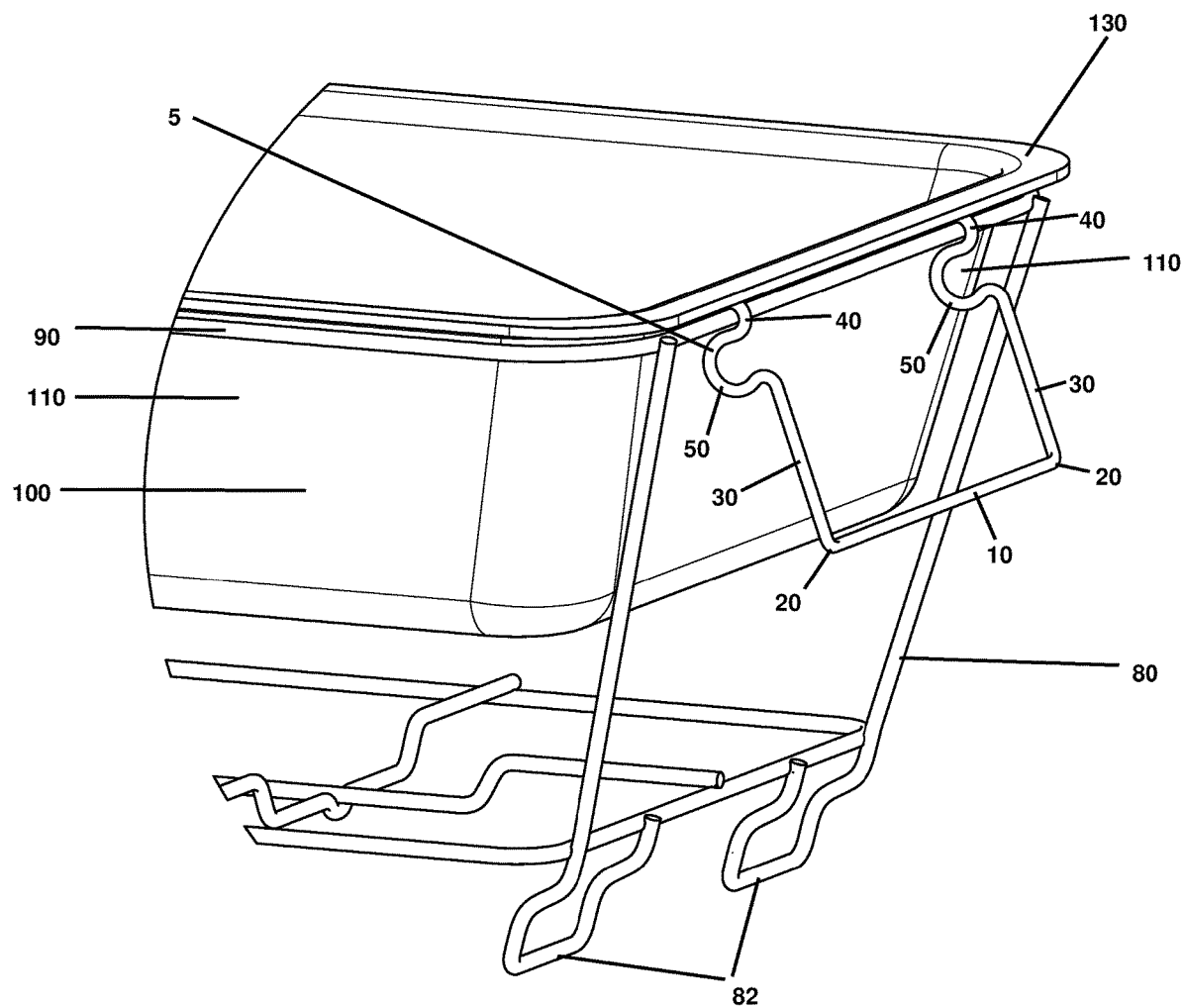
FIG. 6 is a close-up perspective view of the handle attached to the wire chafing stand of FIG. 5.

FIG. 6 is a close-up perspective view of the handle attached to the wire chafing stand of FIG. 5. In embodiments of the disclosed technology, bottom pan 100 is inserted into wire chafing stand 80 such that a rim 130 thereof rests upon top wire 90 after handles 5 are connected. A handle 5 is rotatably connected to top wire 90 by way of exterior bends 40, in embodiments. The handle 5, in embodiments of the technology, is connected to wire chafing stand 80 such that were the handles 5 to be rotated upward, such that top wire 90 would be in between first linear portion 10 and the parts of legs 82 (at a "bottom" of the wire chafing stand 80) designated, in embodiments of the disclosed technology, to stand flat on a supporting surface, an uppermost part of interior bend 50 would be positioned above the rim 130 of bottom pan 100, thus securing it. "Upward," "uppermost," "top," "bottom," and other such orientational descriptors are defined in relative terms, with the plane containing the parts of legs 82 (at a "bottom" of the wire chafing stand 80) designated, in embodiments of the disclosed technology, to stand flat on a supporting surface of wire chafing stand 80 being designated the "bottom." Rim is defined as "a substantially flat, coplanar, unitary form which surrounds, forms a unitary structure with, and expands in an outward direction from a top of, sides of an enclosure."

Figure 7:
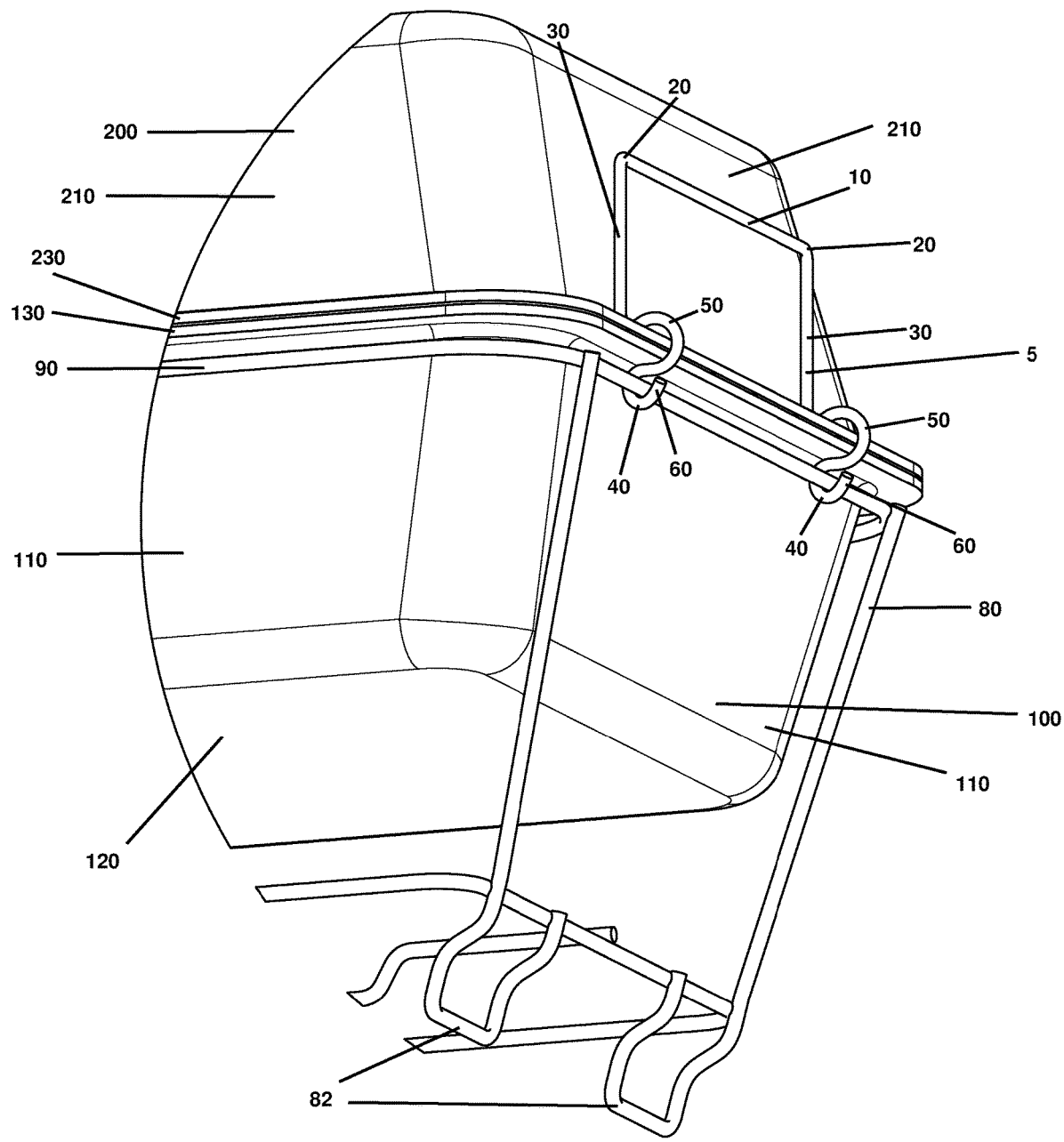
FIG. 7 is a close-up bottom and right perspective view of the wire chafing stand with handle holding a top and bottom pan together in an embodiment of the disclosed technology.
Figure 9:
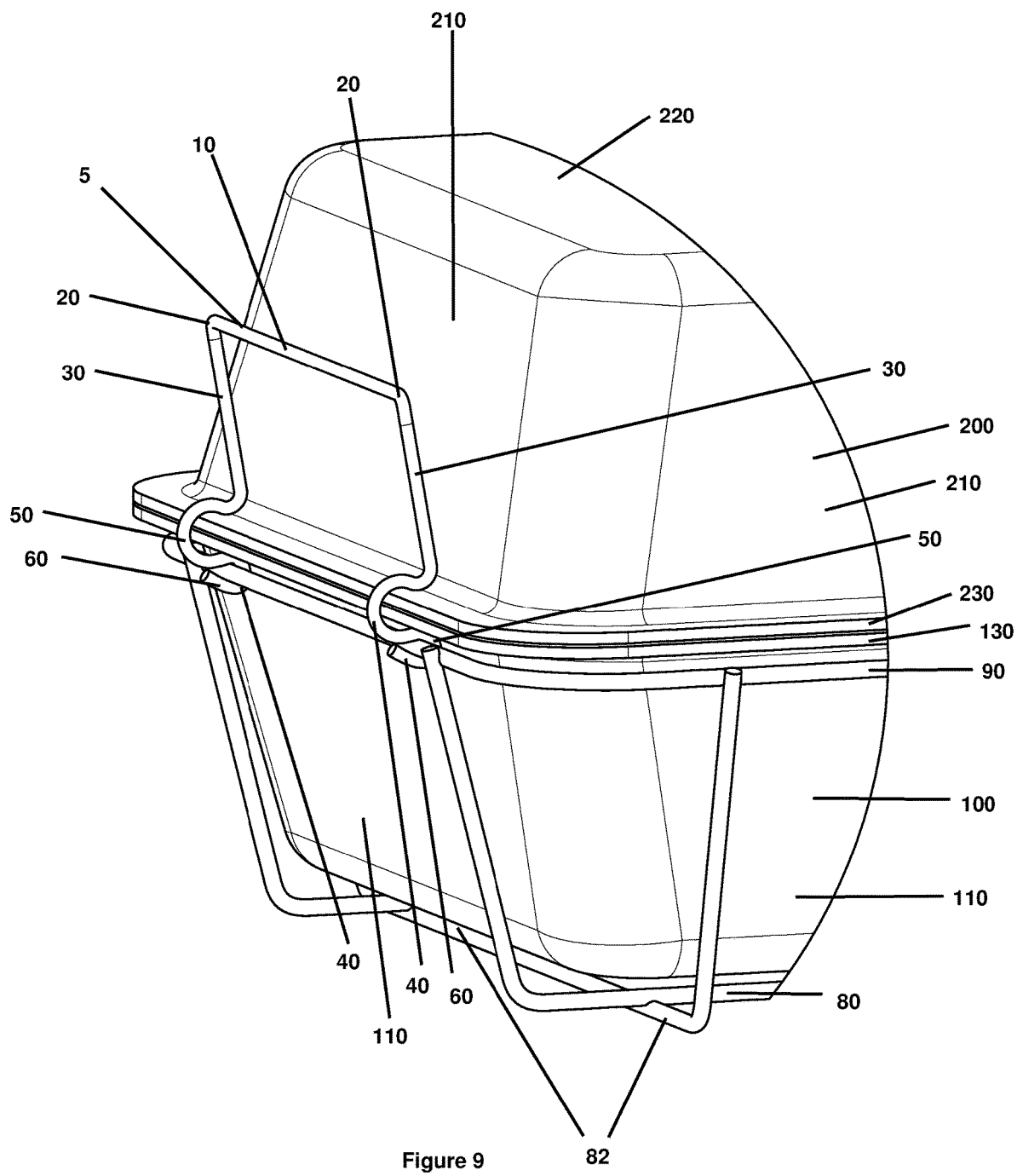
FIG. 9 is a close-up top and left perspective view of the wire chafing stand with handle holding a top and bottom pan together in an embodiment of the disclosed technology.

FIG. 7 is a close-up bottom and right perspective view of the wire chafing stand with handle holding a top and bottom pan together in an embodiment of the disclosed technology. FIG. 9 is a close-up top and left perspective view of the wire chafing stand with handle holding a top and bottom pan together in an embodiment of the disclosed technology. In embodiments of the disclosed technology, bottom pan 100 is inserted into wire chafing stand 80 such that a rim 130 thereof rests on top wire 90 after handles 5 are connected. Top pan 200 is inserted on top of bottom pan 100 such that a largest planar portion of top pan 200 is in a topmost position, the openings of bottom pan 100 and top pan 200 are connected, and the rim 230 of top pan 200 lies on top of the rim 130 of bottom pan 100. In embodiments, a handle 5 is rotatably connected to a top wire 90 by way of exterior bends 40. The connection is secured, in embodiments, by second linear portions 60.

The handle, in embodiments of the technology, is connected to wire chafing stand 80 such that when the handle 5 is rotated upward, such that top wire 90 is in between first linear portion 10 and the parts of legs 82 (at a "bottom" of the wire chafing stand 80) designated, in embodiments of the disclosed technology, to stand flat on a supporting surface of wire chafing stand 80, an uppermost part of interior bend 50 is positioned above the rim 230 of top pan 200, holding in place both top pan 200 and bottom pan 100. This securing position, in some embodiments, retains a distance between first linear portion 10 and a side 210 of top pan 200 nearest it such that first linear portion 10 may be gripped in order to be carried.

Figure 8:
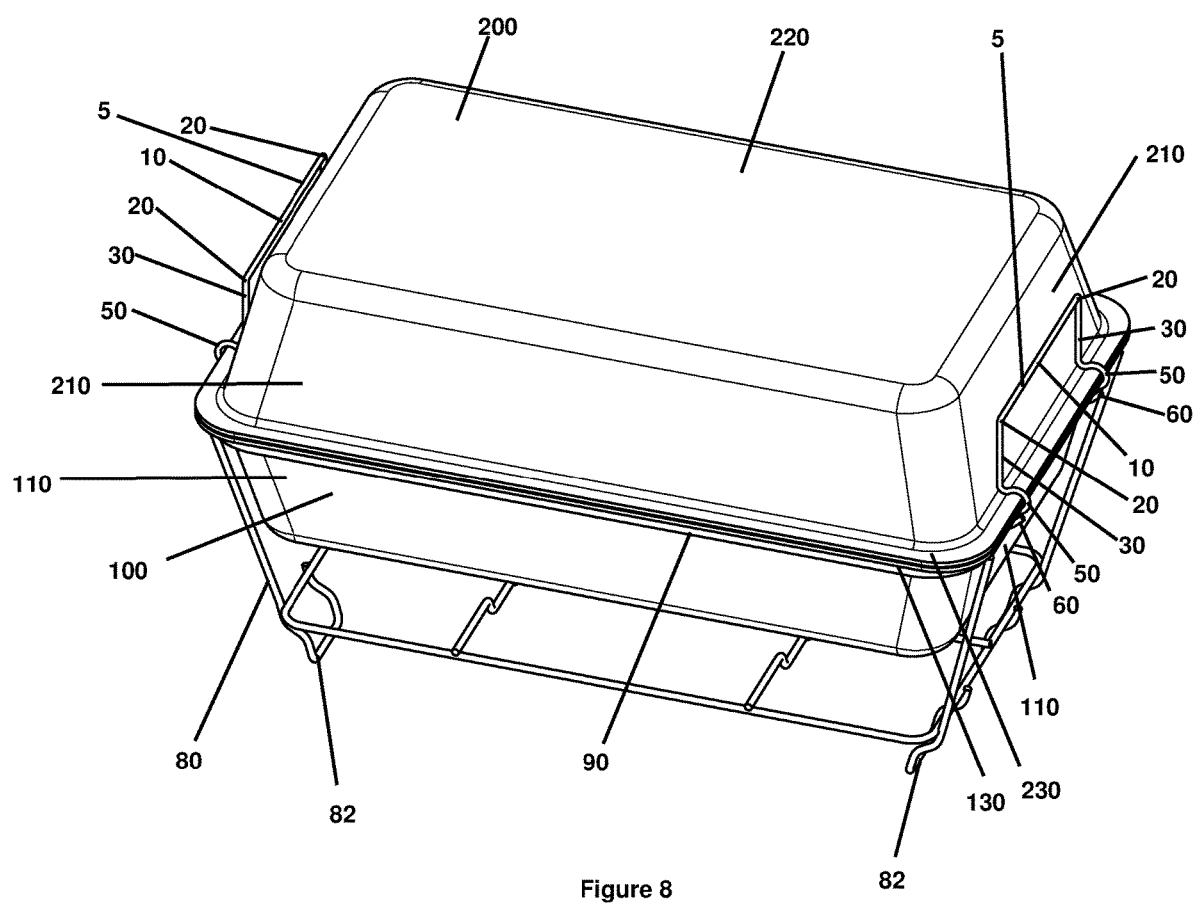
FIG. 8 is a top perspective view of the handle holding a top and bottom pan together in an embodiment of the disclosed technology.

FIG. 8 is a top perspective view of the handle holding a top and bottom pan together in an embodiment of the disclosed technology. In some embodiments, both pans are inserted into wire chafing stand 80 as shown in FIG. 7, and both pans are secured by handles 5 placed on parallel sections of top wire 90. The securing is done in the way shown in FIG. 7.

Figure 10:
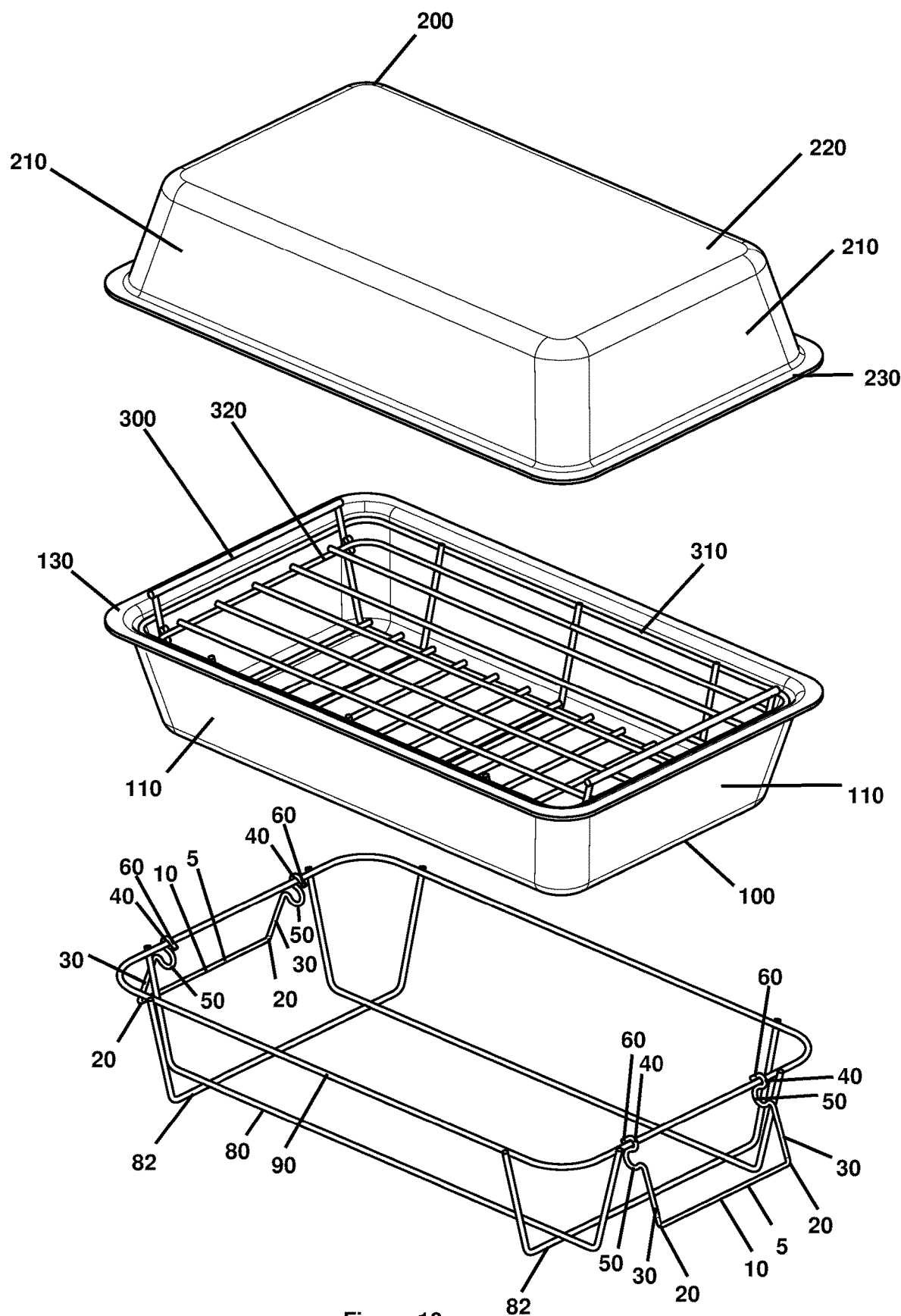
FIG. 10 is an exploded perspective view of a rib rack with handles, a bottom pan with a rib rack inserted therein, and a top pan of embodiments of the disclosed technology.
Figure 11:
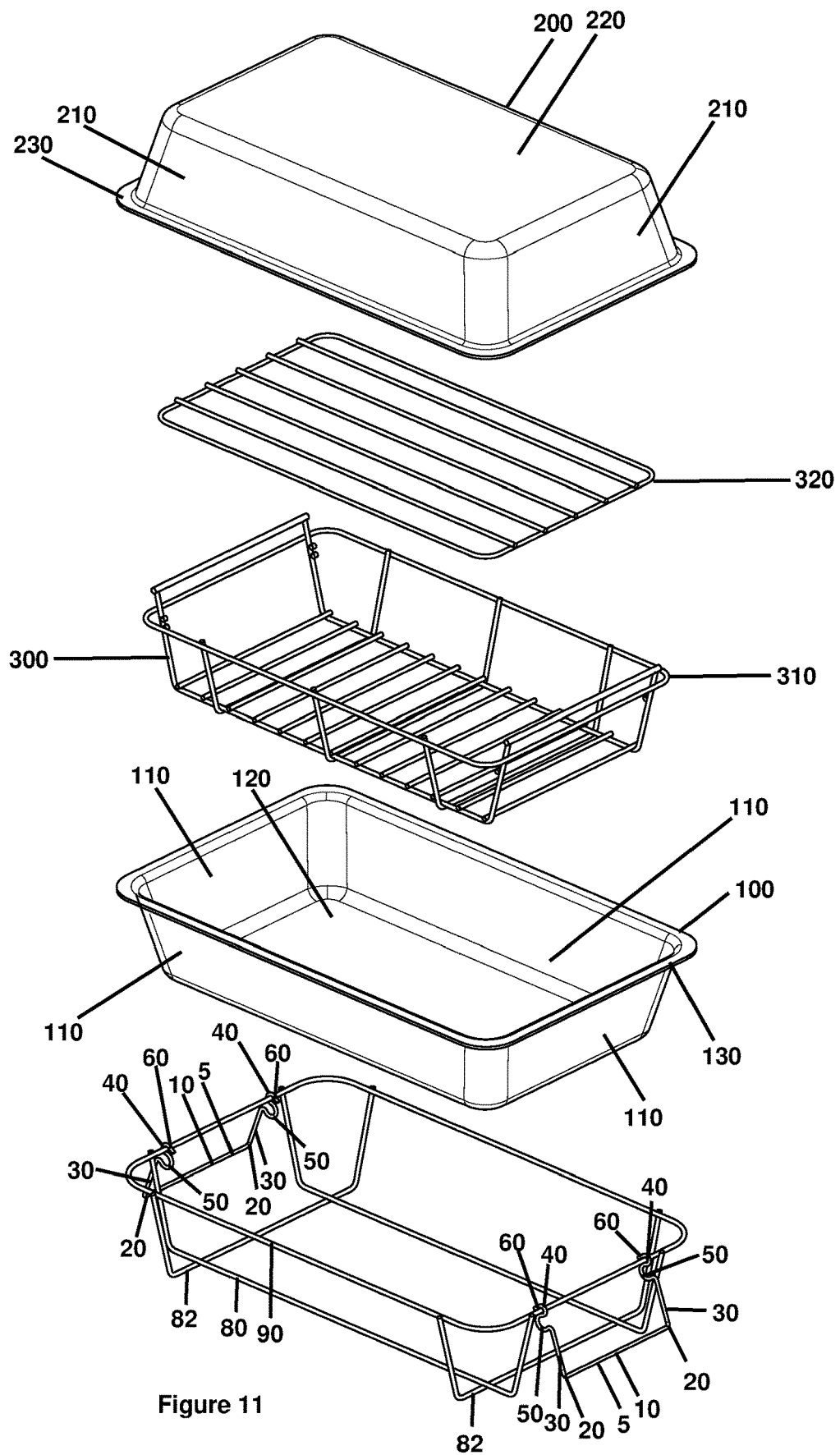
FIG. 11 is an exploded perspective view of a rib rack with handles, a bottom pan, a disassembled rib rack, and a top pan of embodiments of the disclosed technology.

FIG. 10 is an exploded perspective view of a rib rack with handles, a bottom pan with a rib rack inserted therein, and a top pan of embodiments of the disclosed technology. FIG. 11 is an exploded perspective view of a rib rack with handles, a bottom pan, a disassembled rib rack, and a top pan of embodiments of the disclosed technology. In this embodiment, the handle 5 holds the bottom pan 100 and the top pan 200 together with a rib rack 300 inserted in between the two pans 100, 200. In some embodiments, the rib rack 300 is oriented such that a top rectangular wire 310 of the rib rack 300 is substantially completely parallel to the upper wire 90 of the wire chafing stand 80. In embodiments, a rib rack 300 is inserted by way of an upper portion 320 thereof.

Put differently, in some embodiments of the disclosed technology, each handle 5 of the handles has an exterior bend 40 which is connected to a lower rectangular wire 90. Resting upon the lower rectangular wire 90 is a rim 130 of a bottom pan 100 with an opening parallel to a plane of lower rectangular wire 90. Resting upon and/or within the rim 130 of the bottom pan 100 is a top wire 310 of a rib rack 300. A plane of the top wire 310 of rib rack 300 is parallel to the plane of lower rectangular wire 90. In some embodiments, resting upon and/or within the rib rack 300 is an upper portion 320. Resting upon the top wire 310 of the rib rack 300 and/or upon the rim 130 of the bottom pan 100 is a rim 230 of a top pan 200. The top pan 200 has an opening parallel to the plane of the lower rectangular wire 90.

When the handle 5 is rotated such that transverse portions 30 of the handle 5 are perpendicular to the plane of the lower rectangular wire 90 and a first linear portion 10 of the handle 5 is parallel to and above the plane of the lower rectangular wire 90, an interior bend 50 of handle 5 holds secure, relative to the lower rectangular wire 90, any one or combination of the bottom pan 100, the rib rack 300, the upper portion 320 of the rib rack, and the top pan 200.

For purposes of this disclosure, the term "substantially" is defined as "at least 95% of" the term which it modifies.

Any device or aspect of the technology can "comprise" or "consist of" the item it modifies, whether explicitly written as such or otherwise.

When the term "or" is used, it creates a group which has within either term being connected by the conjunction as well as both terms being connected by the conjunction.

While the disclosed technology has been disclosed with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

The invention claimed is:

1. A removably attachable handle for a closed metal loop, said handle comprising:
   a single wire having a line of symmetry;
   either side of a first linear portion of said single wire terminating in a right angle bend forming a transverse portion of said single wire on said either side of said first linear portion;
   each of said transverse portions connecting at a terminal end thereof to two oppositely-oriented coplanar bends, each of said two oppositely-oriented coplanar bends being substantially curved at each point thereof and further comprising a spaced-apart section between said coplanar bends;
   wherein a line passing through said two oppositely-oriented coplanar curves or through any connective portion there-between is substantially out of line with a line passing through said transverse portion;
   an exterior bend of said two oppositely-oriented coplanar bends being disposed further from said first linear portion and being smaller than an interior bend of said two oppositely-oriented coplanar bends.

2. The handle of claim 1, wherein said first linear portion of said single wire has a length greater than a length of said transverse portion of said single wire.

3. The handle of claim 1, wherein said exterior bend terminates in a second linear portion, substantially all of said second linear portion being disposed in a same plane as said two oppositely-oriented coplanar bends.

4. The handle of claim 3, wherein said second linear portion is disposed at an acute angle compared to said transverse portion.

5. The handle of claim 4, wherein a length of said two oppositely-oriented coplanar bends, as well as the said spaced-apart section, is smaller than said length of each said transverse portion.

6. The handle of claim 1, wherein said exterior bend of said two oppositely-oriented coplanar bends has an opening facing an opposite direction relative to said interior bend.

7. The handle of claim 1, wherein said exterior bend is sized to removably attach to and rotate about a wire and said interior bend is sized to clamp rims of two pans together which are situated above said wire while said handle is rotated upwards with respect to a resting position thereof.

8. The handle of claim 1, wherein said exterior bend is rotatable about said closed metal loop and said interior bend clamps rims of two pans together which are situated above said closed metal loop.

9. The handle of claim 1, wherein said single wire is removably rotatably attached to a top wire of a wire chafing stand by way of said exterior bends of said single wire; and
wherein said interior bends are adapted to removably secure a bottom pan to said wire chafing stand.

10. The handle of claim 9, wherein said interior bends hold said bottom pan in place when said single wire is rotated to extend transverse relative to a top plane of said top wire.

11. The handle of claim 9, wherein said interior bends hold a top pan in an oppositely-oriented orientation compared to said bottom pan such that said exterior bends simultaneously hold said top pan and said bottom pan.

12. The handle of claim 11, wherein said interior bends hold said top pan in an oppositely-oriented orientation compared to said bottom pan and a rib rack rests between said top pan and said bottom pan, such that said exterior bends simultaneously hold said top pan, said rib rack, and said bottom pan.

13. A removably attachable rotatable locking handle for wire elements, comprising:
a lower closed wire comprising an uppermost closed wire of a wire chafing stand;
a handle comprising two extreme ends, each with two semi-circular bends;
an exterior bend of said two semi-circular bends rotatably connected to said lower closed wire;
an interior bend of said two semi-circular bends having an opening facing an opposite direction compared to said exterior bend.

14. A kit comprising the removably attachable rotatable locking handle of claim 13 and a first pan having a top edge parallel to a plane of said lower closed wire, said first pan being held removably substantially in place relative to said lower closed wire by way of said interior bend.

15. The kit of claim 14, said kit further comprising a second pan with sides and an opening therebetween, said opening being oppositely disposed from said first pan and being parallel to said plane of said lower closed wire, said second pan being held removably substantially in place resting on said first pan by way of said interior bend.

16. The kit of claim 15, said kit further comprising an upper closed wire which comprises an uppermost loop of a rib rack; wherein said upper closed wire rests in between said first pan and said second pan and rests parallel to said plane of said lower closed wire.

17. The kit of claim 16, wherein said interior bends removably simultaneously hold said first pan and said second pan with said upper closed wire held in between thereof.

18. The wire chafing stand and handle of claim 13, wherein an exterior bend of said two substantially oppositely-oriented coplanar curves is removably rotatably attached to said lower closed wire.

19. The wire chafing stand and handle of claim 18, wherein said wire chafing stand is adapted to be carried by way of said handle when said handle is rotated to extend transverse relative to said plane of said lower closed wire.

20. A method of using said handle of claim 12 to secure a top pan and bottom pan and a rib rack resting in between thereof to said wire chafing stand by:
removably attaching said handle to said wire chafing stand by way of said exterior bends;
resting an upwards-oriented said bottom pan on said wire chafing stand;
resting a rib rack on said bottom pan;
resting a downwards-oriented said top pan on said rib rack rested on said bottom pan;
rotating said handle relative to said wire chafing stand until said interior bends removably clamps rims of said bottom pan and said top pan together with a top wire of said rib rack held in between thereof.

* * * * *